No. 614,711. Patented Nov. 22, 1898.
M. A. FLAUTT.
KING POST FOR VEHICLES.
(Application filed Feb. 1, 1898.)
(No Model.)
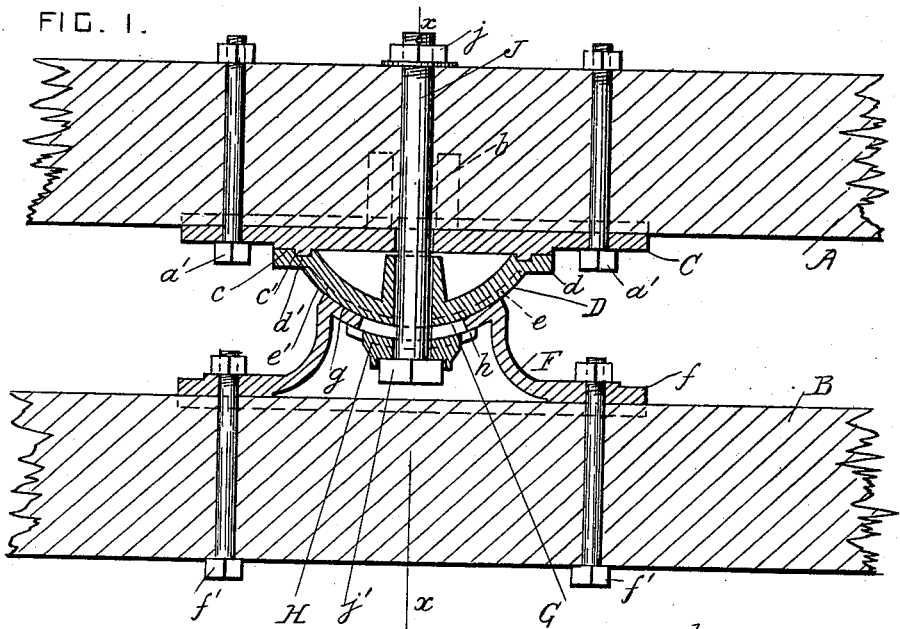
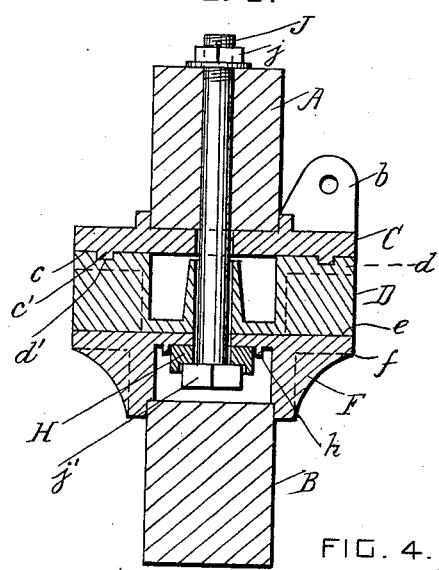
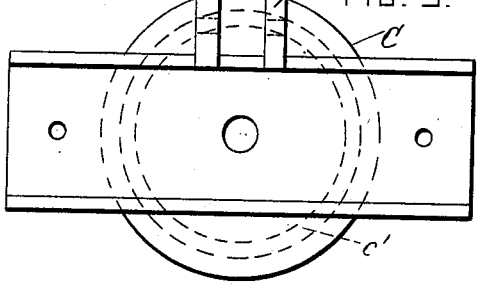
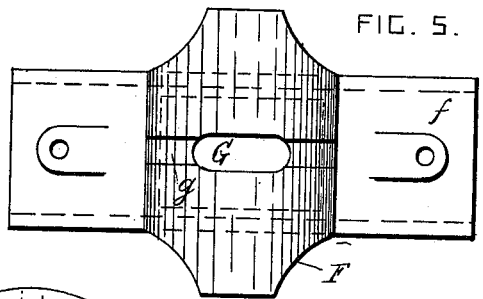
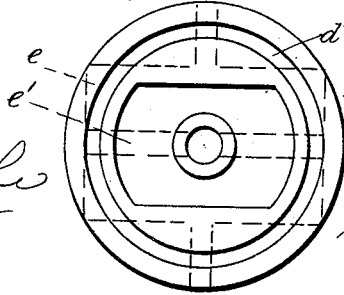
WITNESSES
INVENTOR
Melvin A. Flautt.
by Herbert W. Jenner.
Attorney

UNITED STATES PATENT OFFICE.

MELVIN A. FLAUTT, OF WAYNESBOROUGH, PENNSYLVANIA, ASSIGNOR TO THE GEISER MANUFACTURING COMPANY, OF SAME PLACE.

KING-POST FOR VEHICLES.

SPECIFICATION forming part of Letters Patent No. 614,711, dated November 22, 1898.

Application filed February 1, 1898. Serial No. 668,726. (No model.)

*To all whom it may concern:*

Be it known that I, MELVIN A. FLAUTT, a citizen of the United States, residing at Waynesborough, in the county of Franklin and State of Pennsylvania, have invented certain new and useful Improvements in King-Posts for Vehicles; and I do hereby declare the following to be a full, clear, and exact description of the invention, such as will enable others skilled in the art to which it appertains to make and use the same.

This invention relates to king-posts for vehicles, and more particularly to those used on portable threshing-machines and grain-separators.

This invention consists in the novel construction and combination of the parts hereinafter fully described and claimed.

In the drawings, Figure 1 is a longitudinal section through the king-post. Fig. 2 is a cross-section taken on the line $x\ x$ in Fig. 1. Figs. 3, 4, and 5 are plan views from above of the turn-plate, the revoluble socket, and the slidable socket, respectively.

A is the bolster, which is secured to the body of the vehicle. B is the axle under the bolster. C is a turn-plate which is secured to the bolster by bolts $a'$, and $b$ are lugs for the attachment of the backstays, which assist in securing the said parts rigidly to the vehicle-body. The turn-plate has a bearing-surface $c$, provided with a circular projecting rib $c'$.

D is a revoluble socket provided with a flange $d$ and a recess $d'$. The flange $d$ bears against the surface $c$, and the rib $c'$ engages with the recess $d'$. If desired, the rib can be formed upon the flange and the recess can be formed in the turn-plate, or more than one rib can be formed on the flange or on the turn-plate. The socket D has a convex bearing $e$, formed on a circular arc, and is provided with a projecting rib $e'$. The bearing and the rib $e'$ are arranged longitudinally of the axle and bolster and crosswise of the vehicle.

F is a slidable socket concavo-convex in form and provided with a flange $f$ at its lower part, which is secured to the axle by bolts $f'$. The socket F is provided with a recess $g$ in its upper surface, which slides laterally over the rib $e'$, but, if desired, a rib or ribs $e'$ may be formed on the socket F instead of on the bearing $e$, and the recess or recesses may be formed on the bearing $e$. A slot G is formed in the socket F, and H is a washer-plate which bears against the under side of the socket F, over the slot G, and is arranged between guides $h$. J is a pivot-pin which passes through the washer-plate, the two sockets, the turn-plate, and the bolster. A nut or head $j$ is provided at the upper end of the pin J above the bolster to prevent the pin from dropping, and a head or nut $j'$ is formed or screwed on the lower end portion of the said pin and is preferably let into the washer-plate. The concavo-convex socket F slides upon the bearings $e$ when the vehicle is being drawn over rough ground and adapts itself to the inequalities of the ground. The revoluble socket turns upon the turn-plate when the vehicle is turned to either side. The projecting ribs relieve the pivot-pin of shearing strain, so that the said pin merely has to hold the various parts in working contact. The parts can be made to work in an inverted position, or the turn-plate can be arranged between the socket F and the axle; but the arrangement shown is preferred as being the one which gives the most satisfactory results.

What I claim is—

1. In a king-post, the combination, with two sockets provided with contiguous curved surfaces, one socket being slidable laterally upon the other; of a turn-plate against which one of the said sockets is free to revolve; a washer-plate having a curved surface which is slidable against the other said socket; and a single pin coupling all the said parts and permitting the sockets and washer-plate to turn with respect to the turn-plate, substantially as set forth.

2. In a king-post, the combination, with two sockets provided with contiguous curved surfaces, one socket being slidable laterally upon the other; of a turn-plate against which one of the said sockets is free to revolve, the contiguous bearing-surfaces of the said sockets and turn-plate being provided with intergearing ribs and recesses; and a single pin holding all the said parts in operative contact, substantially as set forth.

3. In a king-post, the combination, with two sockets provided with contiguous curved surfaces, one socket being slidable laterally on the other; of a turn-plate against which one of the said sockets is free to revolve; and a single pin holding the said sockets and turn-plate in operative contact, the said turn-plate and the socket against which it bears being provided with an intergearing rib and groove whereby the said pin is relieved of shearing strain, substantially as set forth.

In testimony whereof I affix my signature in presence of two witnesses.

MELVIN A. FLAUTT.

Witnesses:
J. E. MOORE,
JASON BELL.